March 11, 1958 J. J. KLEIN ET AL 2,826,209
APPARATUS FOR CLEANING DIFFUSER TUBES
Original Filed Dec. 29, 1949
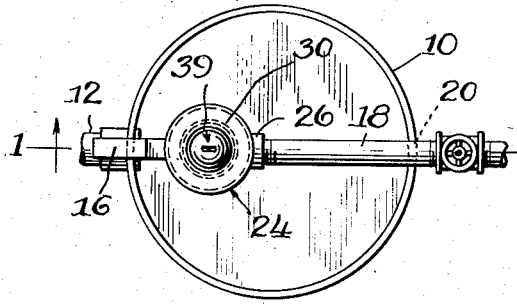
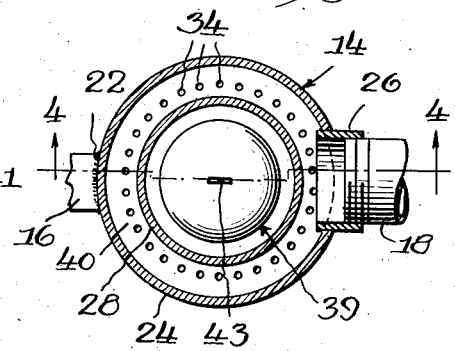
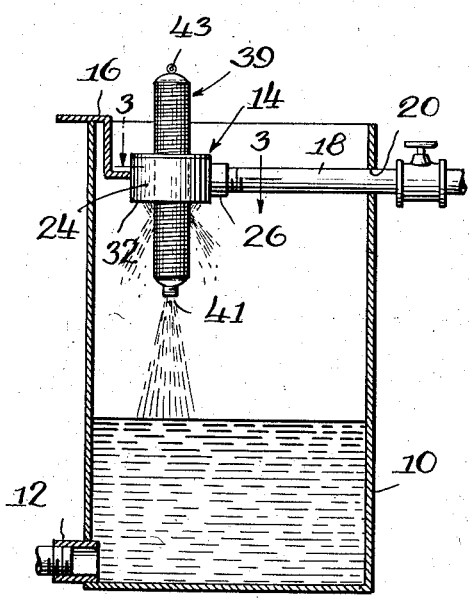
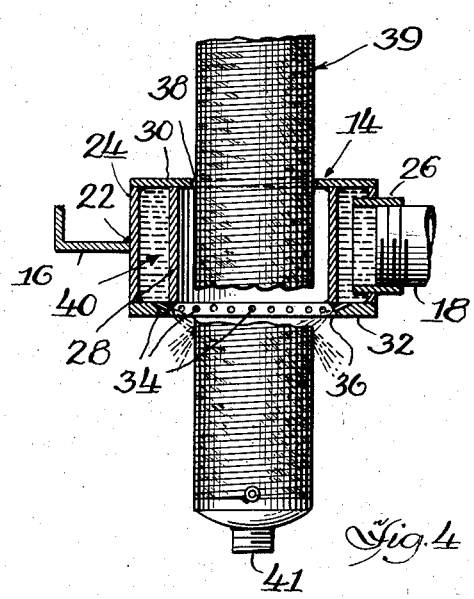
Inventors,
Joseph J. Klein
and Miles A. Lamb
By: Schneider & Dressler, Attys.

United States Patent Office 2,826,209
Patented Mar. 11, 1958

2,826,209

APPARATUS FOR CLEANING DIFFUSER TUBES

Joseph J. Klein, Glencoe, and Miles A. Lamb, Chicago, Ill., assignors to Chicago Pump Company, a corporation of Delaware Original application December 29, 1949, Serial No. 135,782, now Patent No. 2,686,139, dated August 10, 1954. Divided and this application June 14, 1954, Serial No. 438,586

6 Claims. (Cl. 134—170)

This invention relates to an apparatus for cleaning diffuser tubes used for the aeration of liquids or for the dispersion of gases or vapors therein. More specifically, the invention relates to an apparatus for the cleaning of diffuser tubes in which the air or gas is supplied under pressure and passes through pores in the tube into the liquid.

This application is a division of our co-pending application filed December 29, 1949, Serial No. 135,782, now Patent No. 2,686,139, granted August 10, 1954.

The cleaning of diffuser tubes presents a substantial problem in the operation of plants employing such tubes, for example plants engaged in the activated sludge process of treating sewage. In the course of time, such diffuser tubes become badly contaminated with sediment and grease, both due to deposits of solid matter from the liquids in which the tubes are placed, and to impurities such as dust and grease in the input air which is diffused through the tube. When the minute pores of the tube are thus blocked, the pressure drop across the porous medium, and thus the volume of flow for any given input air pressure, are seriously reduced. Thus with the passage of time the efficiency of the aeration process in which the tube is employed is greatly impaired. It thus becomes necessary to periodically clean the diffuser tubes to restore the pores to their original condition.

The present invention provides an apparatus whereby the tubes may be cleaned rapidly and inexpensively. By the apparatus of the present invention, the amount of labor required in the cleaning of the tubes is made small. Furthermore, the present invention completely eliminates the use of strong and potentially harmful cleaning solutions, of the type commonly used in the past in the cleaning of such diffuser tubes. Additionally, the apparatus for cleaning such tubes provided in accordance with the invention is extremely simple and inexpensive both to manufacture and to operate.

One type of diffuser tube now in common use is the diffuser tube of the general type described in the Patent of Carl H. Nordell, No. 2,555,201, granted May 29, 1951.

This type of diffuser tube has achieved substantial success, particularly in the activated sludge process for treating sewage, because of its simplicity and inexpensiveness and its efficiency in diffusion of air. However, the cleaning of diffuser tubes of this type has proven to be a vexing problem.

There arises in the operation of plants employing such diffuser tubes a continuous problem of maintenance due to the necessity of periodically cleaning the tubes in order to prevent the occurrence of excessive pressure drops in the tubes, which would obviously interfere with the proper operation of the aeration process. The method commonly employed for such cleaning is the application of high pressures to the tubes from the inside. This application of pressure is commonly preceded by pre-treatment of the tube with strong agents such as acid or alkali cleaning solutions, the tube being bathed in the solution. The soil is then flushed from the tube by applying a fluid pressure, either of a gas such as air or a liquid such as water, or a mixture thereof, to the interior of the tube.

It is found that such methods are not only highly laborious, but are additionally relatively ineffective in cleaning diffuser tubes of the type mentioned. Although the exact reasons for the failure of such prior art methods to produce satisfactory cleaning of the tubes are not precisely known, it is believed that the difficulty is due to the fact that any cleaning agent which is sufficiently strong to dissolve the soil or to disperse the soil into sufficiently fine particles to pass through the extremely fine pores, is likewise sufficiently strong to carbonize and fix organic materials lodged in and on the diffuser tube. Thus it is believed that the bathing of the tube in even the strong solutions heretofore employed leaves much of the soil in the form of finely dispersed particles in the elongated chambers of the tube. As the liquid cleaning agent is poured off upon removal of the tube from the cleaning solution, much of this soil is again deposited upon the tubes. When fluid pressure is subsequently applied to the diffuser tube, either by the application of high air pressure, or by the insertion of water under pressure, in an attempt to "blow" the particles of soil out through the pores, the soil is again deposited in the pores and formed into small masses which partially block the porous wrapping. It has been found that a considerable number of cycles of this type of cleaning operation are required for complete cleaning of the tube and restoration of the flow resistance of the pores to their original condition.

In employing applicants' apparatus for cleaning diffuser tubes, the tubes are first cleaned in a simple fashion on the exterior. In most cases, this may be done by ordinary flushing away of exterior soil with a common hose. The diffuser tube is then soaked in a detergent composition containing a surface-active agent for the purpose of loosening the soil from the tubes. This soaking is preferably continued for about 10 to 15 hours, but a somewhat shorter time may be employed if the tube is used under conditions where the soiling is extremely slight.

Any well-known type of detergent composition is suitable for use as a bath in loosening the soil which is present in the flutes and the pores. A cationic, anionic or nonionic surface-active agent may be employed as the sole active constituent of a water solution, but improved results are achieved by the addition of a detergent assistant. In cases where the soil adhering to the windings and the core is relatively easily removed, a solution of a detergent assistant may itself have sufficient detergent action to be satisfactory for employment as the detergent composition.

Following the detergent bath, the tubes are then placed in the apparatus of the present invention and all portions of the exterior surface of the diffuser tube are then sprayed with water having a velocity of at least 40 feet per second, and preferably of a velocity of greater than 80 feet per second. It is important to note that this spraying operation (involving the impingement of a multiplicity of water jets on the tube) is preferably carried out with the open neck of the tube suspended downwardly. This is desirable in order that the water will flow freely out of the tube, thus completely and rapidly flushing out the dirt particles loosened by the bath in the detergent composition. It is found that by our apparatus, the tubes may be cleaned with as little as 30 to 60 seconds of application of the water spray. Such a short application of water jets has been found to restore even the most badly soiled of diffuser tubes employed in the activated sludge sewage process to their original pressure drop conditions after the preliminary washing of the exterior, and bathing of the tubes in a suitable detergent composition. In the case of badly soiled tubes, the preliminary step of cleaning the exterior of the tube prior to the bath in the detergent composition is performed with the apparatus of the present invention, rather than with an ordinary hose, which is, however, suitable where the tube is only mildly soiled.

For a full understanding of the invention, reference is made to the illustrative embodiment shown in the drawings, in which:

Figure 1 is a vertical sectional view of the cleaning apparatus embodying the present invention, taken substantially along the line 1—1 of Fig. 2, and illustrating the manner of operation of the apparatus;

Fig. 2 is an enlarged plan view of the cleaning apparatus of Fig. 1;

Fig. 3 is a view of a portion of the cleaning apparatus, taken along the line 3—3 of Fig. 1; and Fig. 4 is a vertical sectional view taken along the line 4—4 of Fig. 3.

Referring to the drawings, the high velocity spraying process is carried out in a cylindrical tank 10 having at the bottom thereof a drain 12. A spray jet assembly, generally designated by the numeral 14, is supported in the interior of the tank 10 near the top thereof by a support bracket 16 which rests on the edge of the tank 10, and on the diametrically opposite side by an inlet pipe 18 which is supported by and extends out through an aperture 20 in the wall of the tank 10.

The inner end of the bracket 16 is secured as by a weld 22 to the outer surface of a short tubular member 24. The diametrically opposed portion of tube 24 is provided with a coupling 26 receiving the input pipe 18. Coaxial with the tube 24 is a second short tubular member 28 of smaller diameter. Secured to the upper edges of the tubes 24 and 28, as by welding, is an annular plate 30 having an outer diameter equal to the diameter of the tube 24 and an inner diameter somewhat smaller than the diameter of the tube 28.

Secured to the bottom ends of the tube members 24 and 28 is an annular plate 32, thus forming an annular water ring 40. The plate 32 has bored therein a circular series of passages 34 extended generally inwardly and downwardly from the upper face of the plate to the inner face thereof, the inner face 36 being bevelled so that the orifices or bores 34 are substantially perpendicular to the inner face 36. The bores 34 are inclined downwardly to form an angle of approximately 60 degrees with the axis of the tubes 24 and 28.

The inner edge 38 of the upper annular plate 30 serves to maintain the centered position of the diffuser tube 39 as it is passed through the assembly 14, as shown in Fig. 4. The downward inclination of the bores 34 has been found desirable in order to avoid the possibility of compacting soil remaining after the preliminary cleaning, into the outer portions of the pores of the tube. By spraying at an angle with respect to the axis of the tube it is assured that soil remaining on the outer surface will be washed off, rather than forced into the pores of the tube. However, the angle at which the jets intercept the axis of the tube must not be less than 45 degrees, since lesser angles of incidence results in failure to properly flush the interior of a diffuser tube. Therefore, the angle at which the jet strikes the diffuser tubes should be between 45 degrees and 90 degrees and is preferably 60 degrees, as in the illustrated embodiment. The bevelling of the inner face 36 serves to maintain the jets at the proper angle without the dispersion which has been found to occur in the absence of such bevelling.

The number of jets or orifices 34 is sufficient to secure complete coverage of the surface of a diffuser tube 39 inserted in the central aperture in the upper plate 30. The water passing through the pores of the tube passes outwardly through open neck 41 at the bottom of the diffuser tube 39.

In a particular embodiment of the apparatus illustrated, the jets 34 were approximately 3/32 inch in diameter; the water pressure maintained at the inlet pipe 18 was between 40 and 60 pounds per square inch; and the velocity of the jets of water incident upon the tube 39 was approximately 80 feet per second.

In a typical practice of the invention with the apparatus shown in an activated sludge processing plant, the tubes are sprayed down with an ordinary hose as the first step of the operation, the tubes which are exceedingly soiled being instead passed through the jet apparatus illustrated. Thereafter the tubes are soaked overnight in a solution of 2% MXP (a detergent consisting of a product of reaction of tall oil fatty acids with ethylene oxide) and 2% sodium metasilicate in water (a detergent assistant). The tubes are then lowered through the assembly 14 and pulled back up, in a time of approximately 30 to 60 seconds, a cord (not shown) tied to eye 43 being used to facilitate this operation. It is then found that all of the tubes, irrespective of the condition of soil existing before the cleaning process, have been restored to their original pressure loss which was, with one construction of diffuser tube of the type shown in the aforementioned Nordell patent, about 8½ inches of water with an air flow rate of 6 cubic feet per minute.

There has been described above the general principles and practices of the invention in conjunction with a particular embodiment of the invention in order to aid in the understanding thereof. It will, of course, be understood that the particular embodiment illustrated is not in itself definitive of the scope of the invention. Therefore, the invention is not to be restricted to the exact structure of the illustrative embodiment described above. For example, while we have referred to tubes of the type shown in the aforementioned Nordell patent, the apparatus of the present invention is also useful in cleaning other diffuser tubes, such as those made from ceramic material or carbon.

We claim:

1. Apparatus for cleaning diffuser tubes comprising two concentric short tubular members of equal length forming an annular space, an annular plate sealed to one end of the tubular members to form one wall of the annular space, a second annular plate sealed to the opposite end of said tubular members to complete the enclosure of the annular space, said second plate having equally spaced circumferentially distributed jet apertures therethrough forming an angle of less than 90 degrees but more than 45 degrees with the axis of said tubular members and having a surface thereof bevelled to form a right angle with said jet apertures, said jet apertures being of restricted dimension so that fluid may be forced through each of said apertures as a jet, and a fluid inlet to the enclosure thus formed, whereby a diffuser tube may be passed through the annular openings in said plates and be cleaned by the force of a fluid passing through said fluid inlet into said annular space and outwardly as jets through said jet apertures at a velocity of at least 40 feet per second.

2. Apparatus for cleaning diffuser tubes comprising two concentric short tubular members of equal length forming an annular space, an annular plate having a central aperture smaller than the diameter of the inner tubular member, said annular plate being sealed to one end of the tubular members to form one wall of the annular space, a second annular plate having a central aperture and equally spaced jet apertures therethrough about the periphery of said central aperture, said jet apertures being of restricted dimension so that fluid may be forced through each of said apertures as a jet, said jet apertures forming an angle of approximately 60 degrees with the axis of said second annular plate, said second annular plate being sealed to the opposite end of the tubular members to complete the enclosure of the annular space, and a fluid inlet to the enclosure thus formed, whereby a diffuser tube may be passed through the central apertures in said annular plates and be cleaned by the force of a fluid passing through said fluid inlet into said annular space and outwardly as jets through said jet apertures at a velocity of at least 40 feet per second.

3. Apparatus for cleaning diffuser tubes comprising two concentric short tubular members of equal length forming an annular space, an annular plate sealed to one end of the tubular members to form one wall of the annular space, a second annular plate having equally spaced jet apertures therethrough forming an angle of less than 90 degrees but more than 45 degrees with the axis thereof, said jet apertures being of restricted dimension so that fluid may be forced through each of said apertures as a jet, said second annular plate being sealed to the opposite end of the tubular members to complete the enclosure of the annular space, and a fluid inlet to the enclosure thus formed, whereby a diffuser tube may be passed through the annular openings in said plates and be cleaned by the force of a fluid passing through said fluid inlet into said annular space and outwardly as jets through said jet apertures at a velocity of at least 40 feet per second.

4. Apparatus for cleaning foraminated diffuser elements comprising two tubular members of equal length, the first of said tubular members having a smaller cross-sectional area than the second of said members and being positioned within said second tubular member to form a space therebetween, a plate sealed to one end of said tubular members to close one end of said space, said plate having a central aperture therethrough no larger than the cross-sectional area of said first tubular member, a second plate sealed to the other end of said tubular members to close the other end of said space, said second plate having a central aperture therethrough no larger than the cross-sectional area of said first tubular member, said second plate having a plurality of jet apertures on the periphery of said central aperture and in communication with said space, said jet apertures being of restricted dimension so that fluid may be forced through each of said apertures as a jet, said jet apertures forming an angle of less than 90 degrees but more than 45 degrees with the axis of said tubular members, the surface of said second plate being bevelled on the periphery of said central aperture to form a right angle with the axis of said jet apertures, and a fluid inlet to said space, whereby a foraminated diffuser element may be passed through said central apertures in said plates and be cleaned by the force of a fluid passing through said fluid inlet into said space and outwardly as jets through said jet apertures at a velocity of at least 40 feet per second.

5. Apparatus for cleaning foraminated elements comprising two tubular members of equal length, the first of said tubular members having a smaller cross-sectional area than the second of said members and being positioned within said second tubular member to form a space therebetween, a plate sealed to one end of said tubular members to close one end of said space, said plate having a central aperture therethrough no larger than the cross-sectional area of said first tubular member, a second plate sealed to the other end of said tubular members to close the other end of said space, said second plate having a central aperture therethrough no larger than the cross-sectional area of said first tubular member, said second plate having a plurality of jet apertures on the periphery of said central aperture and in communication with said space, said jet apertures being of restricted dimension so that fluid may be forced through each of said apertures as a jet, said jet apertures forming an angle of 60 degrees with the axis of said tubular members, the surface of said second plate being bevelled on the periphery of said central aperture to form a right angle with the axis of said jet apertures, and a fluid inlet to said space, whereby a foraminated diffuser element may be passed through said central apertures in said plates and be cleaned by the force of a fluid passing through said fluid inlet into said space and outwardly as jets through said jet apertures at a velocity of at least 40 feet per second.

6. Apparatus for cleaning foraminated diffuser elements comprising two tubular members of equal length, the first of said tubular members having a smaller cross-sectional area than the second of said members and being positioned within said second tubular member to form a space therebetween, a plate sealed to one end of said tubular members to close one end of said space, said plate having a central aperture therethrough no larger than the cross-sectional area of said first tubular member, a second plate sealed to the other end of said tubular members to close the other end of said space, said second plate having a central aperture therethrough no larger than the cross-sectional area of said first tubular member, said second plate having a plurality of jet apertures on the periphery of said central aperture and in communication with said space, said jet apertures being of restricted dimension so that fluid may be forced through each of said apertures as a jet, said jet apertures forming an angle of less than 90 degrees but more than 45 degrees with the axis of said tubular members, and a fluid inlet to said space, whereby a foraminated diffuser element may be passed through said central apertures in said plates and be cleaned by the force of a fluid passing through said fluid inlet into said space and outwardly as jets through said jet apertures at a velocity of at least 40 feet per second.

References Cited in the file of this patent
UNITED STATES PATENTS

| | | |
|---|---|---|
| 1,521,390 | Reynolds | Dec. 30, 1924 |
| 2,616,437 | Secor | Nov. 4, 1952 |
| 2,625,944 | Bloom | Jan. 20, 1953 |